(12) United States Patent
Bradford

(10) Patent No.: US 6,328,889 B1
(45) Date of Patent: Dec. 11, 2001

(54) FILTER ARRANGEMENT

(75) Inventor: Peter Francis Bradford, Kent (GB)

(73) Assignee: Lucas Industries (GB)

( * ) Notice: Subject to any disclaimer, the term of this patent is extended or adjusted under 35 U.S.C. 154(b) by 0 days.

(21) Appl. No.: 09/649,396

(22) Filed: Aug. 28, 2000

Related U.S. Application Data

(63) Continuation of application No. 09/004,458, filed on Jan. 8, 1998, now abandoned.

(30) Foreign Application Priority Data

Jan. 10, 1997 (GB) .................................................. 9700414

(51) Int. Cl.$^7$ .................................................. B01D 35/01
(52) U.S. Cl. .......................... 210/308; 210/313; 210/436; 210/440; 210/472; 210/497.01
(58) Field of Search ...................... 210/188, 306, 210/307, 308, 312, 313, 320, 436, 440, 444, 457, 472, 497.01; 95/261, 262; 96/219, 220

(56) References Cited

U.S. PATENT DOCUMENTS

| | | | |
|---|---|---|---|
| 3,272,336 | * 9/1966 | Humbert, Jr. | ........................ 210/306 |
| 3,312,351 | 4/1967 | Kasten | .................................. 210/307 |
| 4,456,529 | 6/1984 | Shinaver | ............................... 210/313 |
| 4,619,764 | 10/1986 | Church et al. | ....................... 210/312 |
| 4,626,348 | * 12/1986 | Stone | .................................. 210/248 |
| 4,680,110 | * 7/1987 | Davis | .................................. 210/114 |
| 5,382,361 | 1/1995 | Brun | .................................... 210/436 |
| 5,916,442 | * 6/1999 | Goodrich | ............................. 210/306 |

FOREIGN PATENT DOCUMENTS

| | | | |
|---|---|---|---|
| 0547951 | 6/1993 | (EP) . | |
| 0579484 | 1/1994 | (EP) . | |
| 0699834 | 3/1996 | (EP) . | |
| 844671 | * 8/1960 | (GB) | .................................. 210/444 |
| 903505 | 8/1962 | (GB) . | |
| 2292897 | 3/1996 | (GB) . | |

* cited by examiner

*Primary Examiner*—Matthew O. Savage
(74) *Attorney, Agent, or Firm*—Michael Best & Friedrich LLP

(57) ABSTRACT

A filter arrangement is described in which fuel flows through a filter member in a radially outward direction. A sleeve surrounds the filter element and defines, with the filter member, an air collection chamber. One or more small openings are provided in the sleeve whereby air is permitted to escape from the air collection chamber at a controlled rate.

7 Claims, 1 Drawing Sheet

FILTER ARRANGEMENT

RELATED APPLICATIONS

Figure 1:
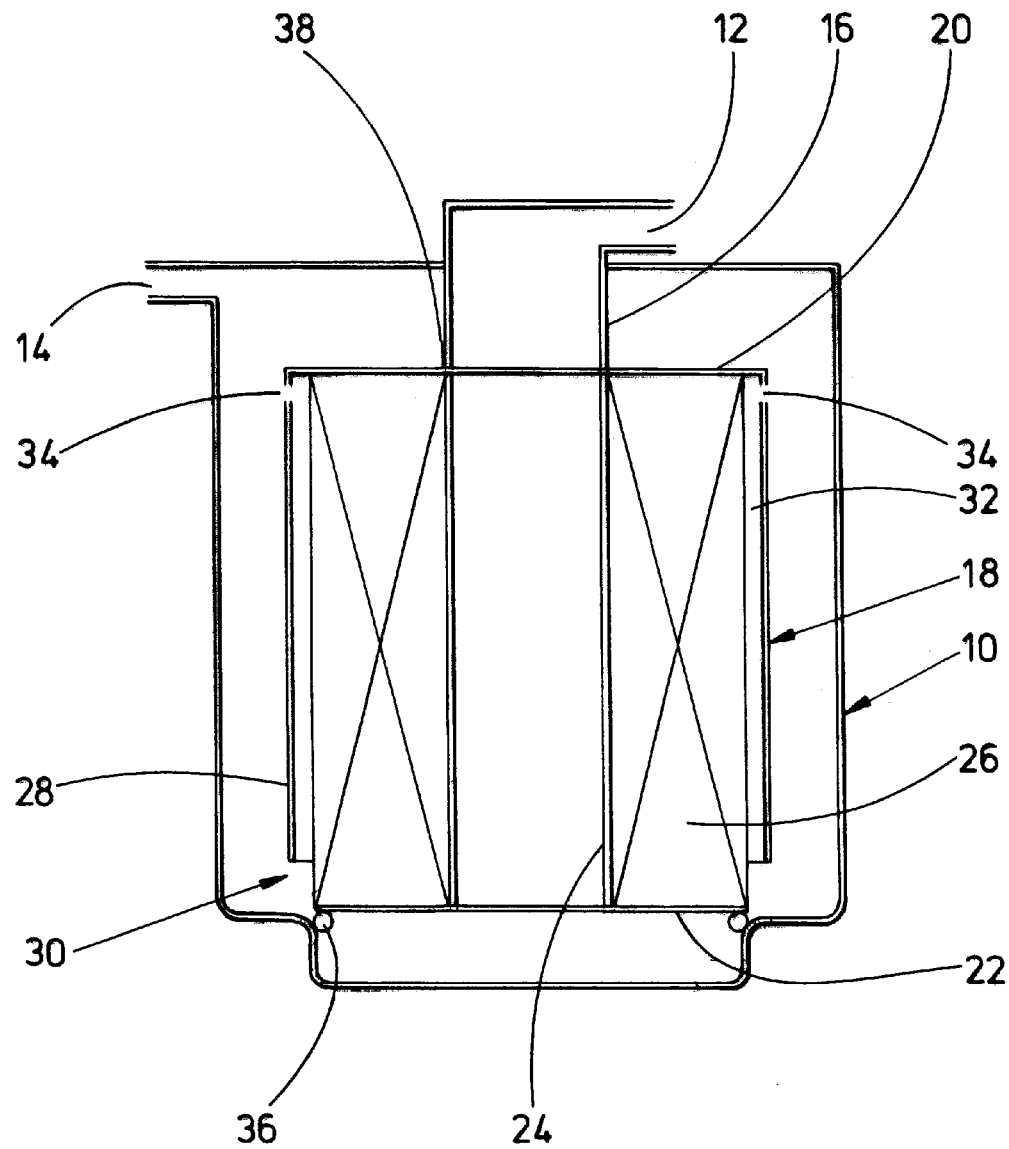

This is a continuation of U.S. patent application Ser. No. 09/004,458 filed Jan. 8, 1998, now abandoned.

This invention relates to a filter for use in removing contaminants from a supply of fuel to an engine, the filter being particularly suitable for use in filtering contaminants from a supply of diesel for a compression ignition internal combustion engine.

In a known filter arrangement, a pleated filter member is located within a substantially cylindrical housing. The filter member is folded so that, in cross-section, the filter member is of star-like form. An axially extending perforated tube is located within the housing, the tube being arranged to receive fuel from a fuel tank. In use, fuel flows from the fuel tank to the axially extending tube. The fuel passes through the perforations of the tube to the filter member. The filter member prevents continued movement of contaminants carried by the fuel whilst permitting the fuel to pass through the filter member to a chamber adjacent in inner surface of the housing wall. The filtered fuel can then flow to an outlet from where it is supplied to a high pressure fuel pump. A suitable pump may be located either upstream or downstream of the filter to supply fuel to or draw fuel through the filter.

This type of filter arrangement may alternatively be used with fuel being supplied from the fuel tank to the chamber adjacent the housing wall, the fuel flowing in a radially inward direction through the filter member towards the axially extending tube. The clean fuel reaching the tube is then supplied to a high pressure fuel pump or other device.

The fuel supplied to the filter often carries with it a considerable amount of air. Where fuel flows from the outside of the filter member towards the axially extending tube, it is known to provide an arrangement whereby the air is collected and removed as required through a bleed outlet. Alternatively, an arrangement may be provided whereby air is allowed to continue with the flow of fuel at a controlled rate, the quantity of air permitted to flow with the fuel being sufficiently low that operation of the high pressure fuel pump or other devices downstream of the filter is not affected.

It is an object of the invention to provide a filter arrangement of the type in which fuel flows in a radially outward direction, and in which air is permitted to continue with the flow of fuel at a controlled rate.

According to the present invention there is provided a filter assembly comprising a housing, a filter member located within the housing, the housing including an inlet arranged to permit dirty fuel to be supplied to a central chamber within the filter member and an outlet arranged to permit clean fuel to be removed from an outer chamber surrounding the filter member, and a sleeve surrounding an upper part of the filter member and defining with the filter member an air collection chamber, at least one small opening being provided whereby air is permitted to flow at a controlled rate from the air collection chamber to the outer chamber.

The filter member is conveniently of generally cylindrical form.

The filter member and sleeve conveniently form part of a filter cartridge which further comprises an upper support plate and a lower support plate, the support plates being secured to one another by an axially extending tubular member, the filter member engaging the support plates to substantially prevent contaminant flow between the filter member and the support plates. The sleeve conveniently depends from the outer periphery of the upper support plate, the lower edge of the sleeve being axially spaced from the lower support plate.

The invention further relates to a filter cartridge for use in such a filter arrangement.

The invention will further be described, by way of example, with reference to the accompanying drawing which is a diagrammatic sectional view of a filter arrangement in accordance with an embodiment of the invention.

The filter assembly illustrated in the accompanying drawing comprises a generally cylindrical housing 10 having an inlet port 12 and an outlet port 14. The inlet port 12 communicates with a downwardly extending, axial tube 16 which is integral with the housing 10.

A filter cartridge 18 is located within the housing 10, the filter cartridge 18 comprising an upper annular support plate 20 and a lower annular support plate 22. The support plates 20, 22 are interconnected by a perforated tubular member 24. A filter member 26 surrounds the tubular member 24, the filter member 26 being located between the upper and lower support plates 20, 22. The filter member 26 conveniently takes the form of a pleated paper member, but it will be understood that other materials are suitable, for example felt or a sintered material or spun synthetic fibres.

Radially outward of the filter member 26 is located a tubular sleeve 28 which is connected at its upper end to the outer periphery of the upper support plate 20. As illustrated in the accompanying drawing, the lower edge of the sleeve 28 is axially spaced from the lower support plate 22. Thus a region 30 is defined through which fuel is permitted to flow, in use, to escape from the filter cartridge 18.

The sleeve 28 is radially space from the outer edge of the filter member 26, thus a chamber 32 is defined between the sleeve 28 and the filter member 26, the chamber 32 acting, in use, as an air collection chamber. As shown in the drawing FIGURE, a major lower portion of the sleeve is substantially imperforate, and a minor upper portion of the sleeve includes at least one opening 34. The small openings 34 are of dimensions such that air collected in the air collection chamber 32 is permitted to escape through the openings 34 at a controlled rate.

The filter cartridge 18 is sealed within the housing 10, an O-ring 36 being located upon an annular wall 40 provided on the lower wall of the housing 10, the O-ring 36 engaging the outer periphery of the lower support plate 22, an O-ring 38 providing a seal between the tube 16 and the upper end of the tubular member 24. Although not illustrated, the housing 10 may take the form of a two part housing comprising a cup and a lid, the inlet and outlet ports 12, 14 being carried by the lid. Where such an arrangement is provided, separation of the lid from the cup permits replacement of the filter cartridge 18, the action of securing the lid to the cup appropriately sealing the filter cartridge 18 to the housing 10.

A pair of drain openings 42 are provided in the lower wall of the housing 10, the openings 42 being located adjacent, but on opposite sides of the annular wall 40. A screw-threaded plug 44 is arranged to close the openings 42. In use, any water droplets which collect in the lower end of the housing 10 can be drained by removing or releasing the plug 44, the water flowing from the housing 10 through the openings 42.

In use, the inlet port 12 is connected to a suitable source of fuel and the outlet port 14 is connected to a high pressure fuel pump. Fuel flows from the source through the inlet port 12 and tube 16 to a central chamber defined by the perforated tubular member 24. Fuel is able to flow through the perforations of the member 24, the fuel flowing through the filter member 26 in a generally radial direction whilst contaminants carried by the flow of fuel are collected by the filter member 26. The fuel at the outer periphery of the filter member 26 flows downwardly, passing through the space 30 to a chamber defined between the outer surface of the sleeve 28 and the inner surface of the housing 10. The clean fuel from this outer chamber is able to flow upwardly towards the outlet port 14 from where it is supplied to the pump.

Air carried by the supply of fuel to the filter cartridge 18 tends to flow upwardly as the fuel flows in the radially outward direction through the filter member 26, the air being collected within the air collection chamber 32 upon exiting the filter member 26. The air collected within the air collection chamber 32 is able to escape at a predetermined rate through the openings 34, the air continuing as a stream of small bubbles with the flow of fuel through the outlet port 14. As the air flows as a stream of small bubbles, the flow of air is not detrimental to the operation of devices downstream of the filter arrangement. It will be appreciated that although the openings 34 are illustrated as being located in an upper part of the side wall of the sleeve, the openings could be provided in the part of the sleeve which is coplanar with the upper support plate.

I claim:

1. A filter assembly comprising a housing, a filter member located within the housing, the housing including an inlet arranged to permit dirty fuel to be supplied to a central chamber within the filter member and an outlet in communication with an outer chamber surrounding the filter member so as to permit clean fuel to be removed from the outer chamber, and a sleeve having an outer surface and an inner surface, the sleeve being connected only to an upper support plate housed within the housing and surrounding an upper part of the filter member, the outer surface of the sleeve defining, together with the housing, the outer chamber and the inner surface of the sleeve defining with the filter member an air collection chamber, the sleeve including a lower free edge being axially spaced upwardly from a lower support plate covering a lower end of the filter member to define a fluid path for clean fuel, whereby fuel can flow from the interior of the filter member to the outer chamber through the fluid path and air carried with the flow of fuel becomes separated therefrom and collects in the air collection chamber, and wherein clean fuel having flowed through the fluid path flows through the outer chamber, and is removed from the filter assembly through the outlet, wherein a major lower portion of said sleeve is substantially imperforate, and wherein a minor upper portion of said sleeve includes at least one opening such that air flows from the air collection chamber through the at least one opening in the sleeve at a controlled rate to the outer chamber to rejoin the flow of clean fuel to the outlet.

2. A filter assembly as claimed in claim 1, wherein the filter member is of generally cylindrical form.

3. A filter assembly as claimed in claim 1, wherein the upper and lower support plates being secured to one another by an axially extending tubular member, the filter member engaging the support plates to substantially prevent contaminant flow between the filter member and the support plates.

4. A filter assembly as claimed in claim 3, wherein the sleeve depends from an outer periphery of the upper support plate.

5. A filter assembly as claimed in claim 1, wherein the sleeve is of substantially cylindrical form.

6. A filter assembly as claimed in claim 1, further comprising drain means permitting the removal of water from both the central chamber and the outer chamber.

7. A filter cartridge comprising upper and lower support plates interconnected by a perforated tubular member, a filter member positioned outside the perforated tubular member, the filter member being located between and engaging the upper and lower support plates to substantially prevent contaminant flow between the support plates and the filter member, and a sleeve only connected to the upper support plate, the sleeve having an outer surface and an inner surface and surrounding an upper part of the filter member, the inner surface of the sleeve defining, with the filter member, an air collection chamber, the sleeve including a lower free edge being axially spaced upwardly from the lower support plate and a lower end of the filter member to define a region whereby fuel can flow from the filter cartridge in radially outward direction, air carried with the flow of fuel being separated therefrom and collecting in the air collection chamber, and wherein a major lower portion of said sleeve is substantially imperforate, and wherein a minor upper portion of said sleeve includes at least one opening providing for escape of air bubbles from the air collection chamber at a controlled rate to rejoin the flow of clean fuel at said controlled rate.

* * * * *